Jan. 5, 1971  P. H. CARR ET AL  3,553,589
METHOD OF MICROWAVE RECTIFICATION AND MIXING
USING PIEZOELECTRIC MEDIA
Original Filed Oct. 12, 1967
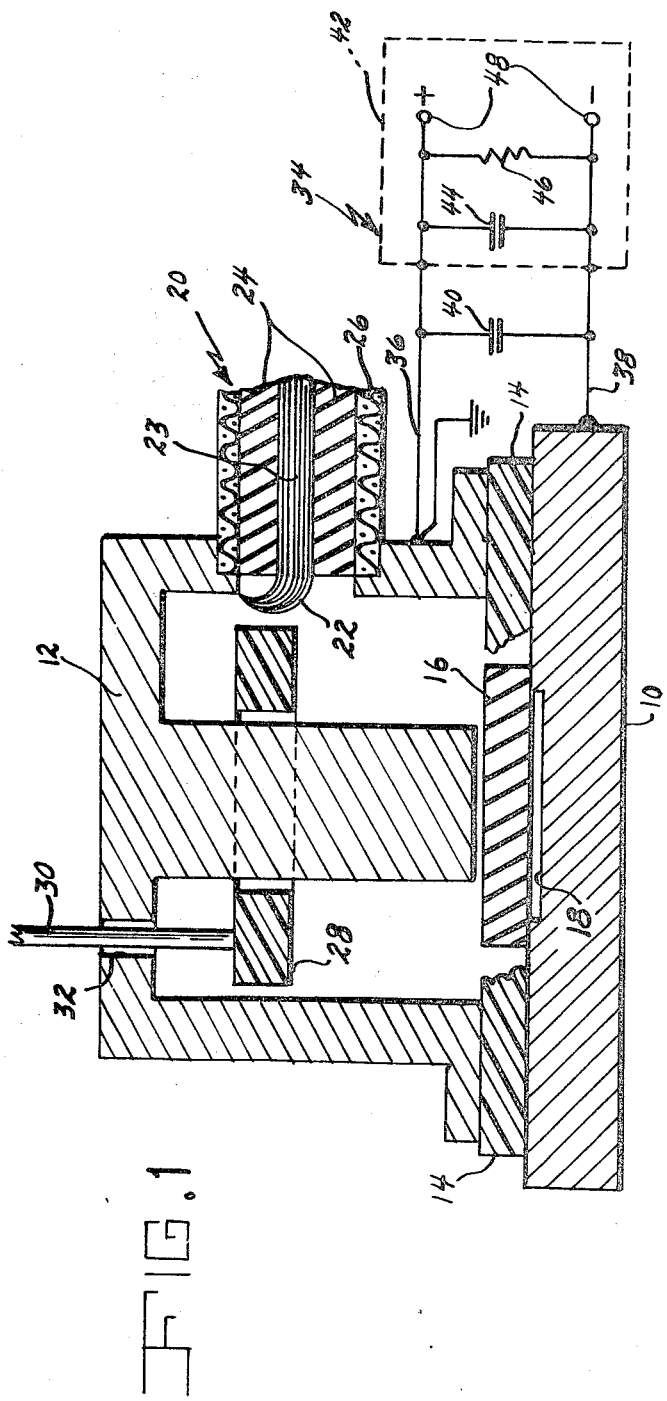
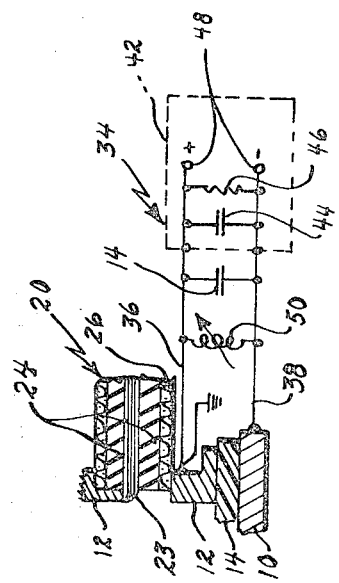
INVENTORS.
PAUL H. CARR
ANDREW J. SLOBODNIK JR.
BY
Harry A. Herbert Jr.
Henry S. Miller
ATTORNEY
AGENT

United States Patent Office 3,553,589
Patented Jan. 5, 1971

3,553,589
METHOD OF MICROWAVE RECTIFICATION AND MIXING USING PIEZOELECTRIC MEDIA
Paul H. Carr, Bedford, and Andrew J. Slobodnik, Jr., Lowell, Mass., assignors to the United States of America as represented by the Secretary of the Air Force
Original application Oct. 12, 1967, Ser. No. 674,993, now Patent No. 3,513,390, dated May 19, 1970. Divided and this application Nov. 26, 1969, Ser. No. 880,003
Int. Cl. H03d 7/00
U.S. Cl. 325—445                                    1 Claim

ABSTRACT OF THE DISCLOSURE

A method of mixing microwave signals by introducing a number of microwave signals of different frequency into a low Q reentrant microwave cavity. The cavity has a tunable variable inductance to provide maximum coupling between the cavity and a preamplifier and a piezoelectric crystal to obtain a voltage from the microwave energy which is then sent to the preamplifier in the form of a voltage that varies sinusoidally at the difference frequency between the microwave signals. The output of the preamplifier is subsequently detected or utilized as practicable.

BACKGROUND OF THE INVENTION

This is a division of application Ser. No. 674,993, filed Oct. 12, 1967, now Pat. No. 3,513,390, issued May 19, 1970. The invention relates generally to microwave rectification and mixing, and more specifically to a method of rectifying and mixing high power microwave energy with piezoelectric media.

The present state of the microwave art makes it possible to utilize semiconducting diodes for measuring low power microwave signals. However, when microwave power reaches extremely high levels such as those used in more advanced communication systems, conventional semiconducting diodes burn out because they lack the capacity to handle such high power. Various methods have been proposed to attain satisfactory results with these devices but prior to this invention none have proved to be satisfactory.

Similarly, high power radar systems presently require complex combinations of switches and attenuators to protect known semiconducting mixers from burning out.

One problem encountered in testing piezoelectric materials, such as piezoelectric quartz, is in separating the voltage produced by radiation pressure or Maxwell-Paraday stress, non-linearities associated with the longitudinal coherent excitation of the resonator and that produced by the thermalization of the energy exciting the quartz disc.

In this invention, separation between the effects is accomplished in the time domain by pulse modulating the microwave energy. The rise time for the non-linearities associated with the coherent excitation of the acoustic resonator is 1 microsecond, while that for the thermal excitation is of the order of milliseconds.

SUMMARY OF THE INVENTION

The instant invention is a method which is capable of using piezoelectric materials in a microwave field of high intensity and obtaining a rectified voltage therefrom. The voltages obtained from this novel method are proportional to the microwave energy in the field, thus providing a way to utilize other conventional measuring means to indicate microwave power levels.

It is contemplated that one application for such a measuring method would be in monitoring the performance of microwave transmitters. In operation, an output of the transmitter would be fed into the resonant cavity. A slidable tuning member would be adjusted to provide a maximum voltage output from the cavity. This would occur when the disc is excited at an overtone acoustic resonance frequency, which occurs when the microwave frequency is adjusted to an odd multiple of the fundamental acoustic frequency of the disc. By simply observing the output of the cavity it is possible to tell whether the transmitter has moved off the designated frequency. The disc can also be used to monitor the transmitter at frequencies different from the acoustic resonance frequencies, but the rectified output will be lower. The sensitivity of the piezoelectric disc utilized in this novel method may be less than that of a conventional diode; however, any disadvantage is overcome by the vast range of power that the disc is able to absorb. Some discs have been known to absorb more than 30 ergs. of input energy. The conventional diode, on the other hand, must be given considerable attention to prevent their burning out. A diode is likely to burn out when the input power is about .1 watt.

The sensitivity of the disc is measurable in millivolts for each watt of input power. Using a linear extrapolation from the one watt power level at which the measurements have been made, it is apparent that one volt would be obtained if the input signal has a 1000-watt peak with a 2-microsecond duration, assuming a duty cycle of about .001.

When a disc is used in a reentrant cavity excited by two separate microwave sources, an intermediate frequency is obtainable. The maximum output is observed when the difference in the frequencies of the two sources equals the fundamental frequency of the quartz disc. The bandwidth obtained with this method and the disc which has, for example, a 29 mHz. fundamental resonance frequency varies between 10 and 40 kHz.

The method then utilizes apparatus consisting of a disc made of piezoelectric quartz or zinc oxide place in a reentry resonant microwave cavity. The quartz disc is X-cut based on crystalographic orientation while the zinc oxide is C-cut. The disc is excited by the microwaves, and non-linearities produce a quasistatic voltage across the disc. This voltage is proportional to the power of the microwave source. The maximum voltage occurs when the cavity is tuned to the overtone acoustic resonance frequency of the disc.

Accordingly then, it is an object of this invention to provide a new and improved method for measuring high levels of microwave power.

It is a further object of this invention to provide a new and improved method of mixing high levels of microwave power.

It is still another object of this invention to provide a new and improved method of obtaining rectified microwave energy.

It is another object of this invention to provide a new method of rectifying microwave energy which utilizes piezoelectric material.

It is still a further object of this invention to provide a new method of mixing microwave energy which utilizes piezoelectric material.

It is another object of this invention to provide a method and means for obtaining a rectified voltage from microwaves in a resonant cavity.

DESCRIPTION OF THE DRAWINGS

FIG. 1 is a cross-sectional view of a microwave cavity with a circuit diagram used in the method of this invention; and FIG. 2 is a segment of FIG. 1 in reduced scale.

DESCRIPTION OF THE PREFERRED EMBODIMENTS

Considering the invention generally, a tunable, reentrant microwave cavity concentrates a microwave field; for example, in the order of 3 gHz. across a quartz disc whose fundamental resonant frequency is approximately 29 mHz. The cavity top is insulated from the base plate by a thin Teflon strip, while the tuning of the cavity is accomplished by moving a dielectric ring along the vertical axis of the cavity.

Referring now in detail in FIG. 1, a base plate 10 supports a top cavity 12. The base plate is separated from the top cavity by means of Teflon insulators 14. A quartz disc 16 is located in the area of a small lumped capacitance in the cavity and covers the lower air gap 18. The disc is capacitively-coupled to the base 10 of the cavity. The coaxial line 20 feeds the microwave energy into the cavity by means of the loop 22 in the center conductor 23. The center conductor is surrounded by insulation 24 and outer shielding 26 in a manner well known in the microwave art.

The cavity is tuned by means of the tuning sleeve 28 which may be made entirely of a low-loss dielectric or it can be made partly of dielectric and partly of metal. The tuning sleeve can be moved axially by a push rod 30 that extends through the opening 32 in the top cavity 12. Alternatively, the tuning sleeve can be moved by low-dielectric constant pins that reach it through axial slots in the inner or outer conductor of the cavity, a means not specifically shown in this invention.

The detection circuit shown generally at 34 detects the quasistatic voltage which occurs across the disc 16 as a result of the microwave energy in the cavity.

The outer covering 26 of the input line 20 is electrically conductive and in conducting relationship to the top cavity 12. The wire 36 is connected to the top cavity 12 and to ground. The wire 38 receives the quasistatic voltage from the disc 16 through the base 10.

The capacitance 40 represents the shunt capacity between the two halves of the cavity and that of the filtering network which prevents any stray microwave energy from reaching the preamplifier 42.

The preamplifier 42 may be of the type manufactured by the General Radio Company, Model 1560-p40. The capacitance 44 represents the input capacitance of the preamplifier while the resistance 46 is the input impedance of the preamplifier and is equal to about 500 megohms for this particular preamplifier. The output or rectified microwave energy is measured across the leads 48 with any conventional voltage measuring device.

With regard to FIG. 2, the structure of the resonant cavity remains substantially unchanged from that of FIG. 1 however, when utilized for mixing two microwave signals $F_1$ and $F_2$ are introduced into the cavity via the coaxial line 20. It is anticipated that some situations would make it more desirable to utilize a plurality of input lines for the microwave signals, which would come within the scope of this invention. The cavity is tuned so that both frequencies are absorbed by the relatively broad resonances of the cavity. To provide a maximum output for mixing, a variable inductance 50 is added to the circuit. The variable inductance is tuned to resonate with capacitors 40 and 44. The output from the terminals 48 of the preamplifier 42 would be an intermediate frequency obtained from microwave signals $F_1$ and $F_2$.

In a specific embodiment utilizing a piezoelectric disc with a fundamental acoustic resonant frequency of 29 mHz., it has been found that a matching preamplifier, one that is tuned to amplify at 29 mHz., provides the most satisfactory results.

Although the invention has been described with reference to particular embodiments, it will be understood to those skilled in the art that the invention is capable of a variety of alternative embodiments within the spirit and scope of the appended claim.

We claim:

1. A method of microwave mixing including the steps of: introducing signals, from a plurality of microwave sources of different frequency, into a low Q reentrant microwave cavity; tuning a variable inductance means to obtain maximum coupling between the cavity and a preamplifier means; sending a voltage obtained from a piezoelectric means in the cavity to the preamplifier; and detecting an output from the said preamplifier in the form of a voltage which varies sinusoidally at the difference frequency between said signals.

References Cited

UNITED STATES PATENTS 2,961,531    11/1960    Howe _____ 250—20

ROBERT L. GRIFFIN, Primary Examiner

K. W. WEINSTEIN, Assistant Examiner

U.S. Cl. X.R.

310—8.2